United States Patent [19]

Schertenleib

[11] 4,078,508
[45] Mar. 14, 1978

[54] METHOD OF MAKING A METALLIC CONTAINER OVERLAID WITH PLASTIC

[75] Inventor: Francis Schertenleib, Vaduz, Liechtenstein

[73] Assignee: Alter Licensing Establishment, Furstentum, Vaduz, Liechtenstein

[21] Appl. No.: 628,054

[22] Filed: Nov. 3, 1975

Related U.S. Application Data

[62] Division of Ser. No. 472,157, May 22, 1974, abandoned.

[30] Foreign Application Priority Data

Oct. 2, 1973 Japan .............................. 48-110916

[51] Int. Cl.² ............................................ B21D 51/16
[52] U.S. Cl. ........................... 113/120 A; 113/120 H; 113/120 XY; 113/120 Z
[58] Field of Search ....... 113/120 A, 120 XY, 120 H, 113/120 Z, 120 R; 220/9 F; 427/275; 425/127, 125, 123, 121, 116, 129 R, 112, 110

[56] References Cited

U.S. PATENT DOCUMENTS

| 2,216,830 | 10/1940 | Roberts | 220/9 F |
| 2,377,393 | 6/1945 | Wiley | 425/129 |
| 2,981,984 | 5/1961 | Orr | 115/1 C |
| 3,037,652 | 6/1962 | Wallace | 220/9 F |
| 3,070,253 | 12/1962 | Brown | 220/9 F |
| 3,663,259 | 5/1972 | Barriere | 215/1 R |
| 3,787,157 | 1/1974 | Valyi | 425/112 |
| 3,797,431 | 3/1974 | Yoshimura | 113/120 AA |

Primary Examiner—Michael J. Keenan
Attorney, Agent, or Firm—Stevens, Davis, Miller & Mosher

[57] ABSTRACT

A metallic container having a cylindrical body is overlaid with an outer layer of thermoplastic material which has a suitable thickness and sectional shape, and it is used as a pressure-proof container such as a spray container. The metallic container is manufactured by forming a plastic layer on the outside of the body part of a metallic cylinder, necking the part of the container from a shoulder portion to an upper-end opening portion, forming a plastic layer on the outside of the necked part, and curling the upper end of the container.

1 Claim, 11 Drawing Figures

U.S. Patent  March 14, 1978  Sheet 1 of 2  4,078,508
FIG. I
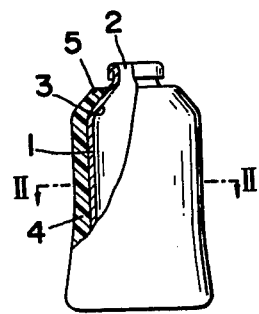
FIG. 3A
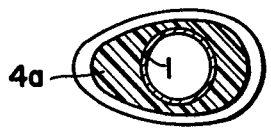
FIG. 3B
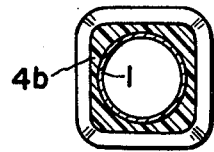
FIG. 2
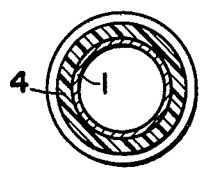
FIG. 3C
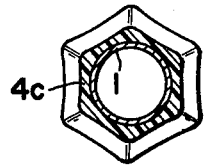

METHOD OF MAKING A METALLIC CONTAINER OVERLAID WITH PLASTIC

This is a division of application Ser. No. 472,157 filed May 22, 1974, now abandoned.

BACKGROUND OF THE INVENTION

The present invention relates to a metallic container formed with a plastic layer on the outside. More particularly, it relates to a method of making a pressure-proof container in which the outside of a metallic cylindrical container body is overlaid with a thermoplastic material having a suitable thickness and a desired sectional shape, so as to give variety to the external appearance of the container.

A container receiving a liquid or gas in the pressure-raised state, such as a spray container, need be made a metallic container of circular section from the viewpoint of strength to withstand pressure. Since it incurs danger to variously change the sectional shape of the container itself, the manufacture of a container of any different sectional shape is prohibited. In order to apparently change the sectional shape of the pressure-proof container, a double structure can be adopted in which the outside of the cylindrical body is covered with an outer tube being, for example, elliptical, oval or polygonal in section. With this measure, however, not only are the exterior designs limited, but also the manufacture becomes complicated and costly.

SUMMARY OF THE INVENTION

It is an object of the present invention that, where pressure-proof containers have a variety of exterior designs are to be produced, they can be attained without spoiling the pressure-withstanding property of a metallic container. More specifically, the part of a metallic cylindrical body required for the pressure-proof container is not especially worked in shape, and a thick layer of thermoplastic material having a proper shape is formed on the outside of the cylindrical body. The layer can be formed by putting the cylindrical body into a metal mold and then extruding the thermoplastic material into a cavity around the cylindrical body. As regards the shape of the layer, namely, the external appearance of the finished container, any desired sectional shape may be selected and determined by the shape of the cavity of the metal mold.

The cylindrical body is chiefly made of alloys of the aluminum series. Employed as the thermoplastic resin are polyethylene, polystyrene, nylon, polyvinyl chloride, etc.

Since the container thus manufactured is formed with the plastic overlay on the outside of the cylindrical container, it can have a desired sectional shape or external appearance in dependence on use, taste, contents, capacity and so forth. The container itself has an internal metallic cylinder, and therefore passes the standards for pressure-proof containers, such as one for spraying aerosol.

As understood from the above description, the principal object of this invention is to provide a pressure-proof container which has a plastic overlay formed on the outside of a cylindrical container body in close adherence thereto, so that it has a desired exterior design.

Another object of the present invention is to provide a method which can readily manufacture such pressure-proof container.

The other objects will become apparent from the following detailed description when read with reference to the accompanying drawings. In the drawings, like reference symbols designate like constituent parts.

BRIEF DESCRIPTION OF THE DRAWINGS

FIG. 1 is a front view of a container, with parts broken away and shown in section;

FIG. 2 is a sectional view taken along a line II - II in FIG. 1;

FIGS. 3A to 3C are sectional views showing modifications in correspondence with FIG. 2;

PREFERRED EMBODIMENTS OF THE INVENTION

Figure 4:
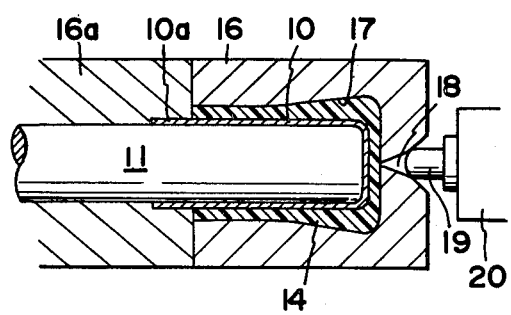
FIG. 4 is a sectional view illustrating the stage of work of molding a plastic overlay or outer cover layer on the outside of a container body.

FIGS. 1 and 2 are a front view, partially broken away, of a container according to the present invention and a cross-sectional plan view thereof, respectively. A shoulder portion 3 gradually reduced in diameter is formed in a manner to extend from the upper part of a metallic container body 1 of circular section to an opening portion 2. An overlay or outer cover layer 4 of thermoplastic material is integrally deposited on the outer peripheries of the container body 1, the shoulder portion 3 and a bottom 26. As shown in FIG. 2, the outer cover layer 4 has a sectional shape of a circle concentric with the container body 1. As illustrated in FIGS. 3A to 3C, the overlay may also be an outer cover layer $4_a$ of elliptical section, an outer cover layer $4_b$ of square section or an outer cover layer $4_c$ of hexagonal section. Further, uneven patterns of various sizes (not shown) may be formed on the surface of such outer cover layer. According to the sectional shape of the outer cover layer 4, $4_a$, $4_b$ or $4_c$, a shoulder overlay 5 contiguous to the outer cover layer is integrally formed in a manner to extend from the upper part of the body 1 to the vicinity of the opening portion 2.

When the plastic material at the outer periphery of the container body has its thickness gradually increased toward the bottom as illustrated in the figures, the bottom portion of the final product becomes larger, and the container is stabilized against an upset. The plastic at the outer periphery of the shoulder portion may be thinner than the plastic at the outer periphery of the container body. In general, the thickness of the thermoplastic material is greater than that of the container body. More specifically, the thickness of the thermoplastic material is usually 5 – 10 mm or greater, and is at least 2 mm.

Since the container thus produced has the outer cover layers of plastic on the outside of the cylindrical container body 1, the bottom 26 and the shoulder portion 3, it can be made an aerosol spraying container which has a desired sectional shape or external appearance according to its use, taste and contents.

FIGS. 4 to 8 illustrate the manufacturing process of the container of the present invention.

Shown in FIG. 4 is the stage of work in which a mandrel 11 adapted to substantially closely fit into a bottomed metallic cylinder 10 subjected to the deep drawing is inserted into the cylinder, they are arranged in a metal mold 16, and an outer cover layer 14 of thermoplastic material is extruded and molded on the outer periphery of the cylinder 10. While the cylinder 10 is mostly entered into the metal mold 16 having a cavity 17, a part $10_a$ of the cylinder on the opening portion side (a part at which a shoulder portion is formed later) is mantled and carried in an opposing metal mold $16_a$. The cavity 17 inside the metal mold 16 is of such a size and shape as to produce an outer cover layer on the metallic cylinder 10 which will be of the desired sectional shape and external appearance, as shown by way of example in any one of FIGS. 2 and 3A to 3C. In the front face of the metal mold 16, there is provided an inflow port 18 which corresponds to a nozzle 19 of a molding machine 20.

Figure 5:
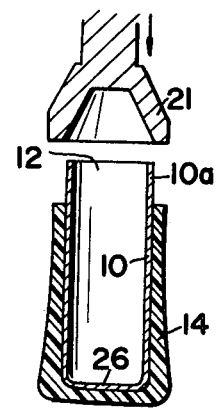
FIGS. 5 and 6 are sectional views illustrating the stage of work of stamping a shoulder portion on the opening side of the container.
Figure 6:
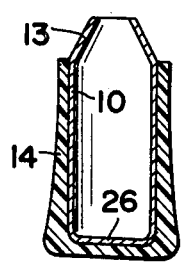

After the overlay 14 has been formed on the body part of the bottomed cylinder 10, a shoulder portion 13 reduced in diameter towards an opening portion 12 is necked, as illustrated in FIGS. 5 and 6, in such way that the part not provided with the overlay is stamped by means of a metal mold 21 which has a tapering inside. This stage of work is similar to the necking press in the conventional process of manufacturing a metallic container.

Subsequently, a shoulder outer cover layer 15 is molded on the shoulder portion of the cylinder by the use of thermoplastic material of the same sort as that of the overlay 14. This stage of work adopts either of two methods.

Figure 7A:
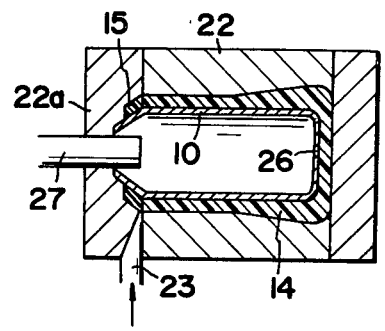
FIGS. 7A and 7B are sectional views each illustrating the stage of work of molding a plastic overlay on the outside of the shoulder portion.

The first method is illustrated in FIG. 7A. As shown in the figure, the cylinder 10 which has already been integrally formed with the thermoplastic layer 14 is placed in a metal mold 22. On the side of the shoulder portion 13, a metal mold $22_a$ registers with a hollow shank 27 penetrating therethrough. The metal mold $22_a$ is formed with a cavity around the shoulder portion, and has an inlet 23 for the plastic material at a certain part thereof. Under the state under which the metals molds 22 and $22_a$ are registered and the opening portion is supported by the shank 27, the plastic material molten is extruded from the inlet 23. Thus, the plastic layer 15 is molded on the outer periphery of the shoulder portion.

Figure 7B:
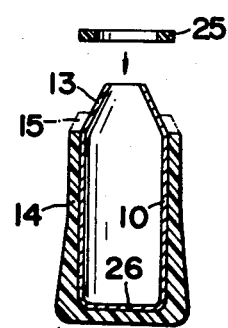

The second method for molding the plastic layer of the shoulder portion is illustrated in FIG. 7B. In this case, an annular member 25 of plastic is employed, and it is made integral with the outer cover layer 14 on the shoulder portion 13 by such procedure as compression molding and thermal bonding.

In the case of FIG. 7A, an air pressure may be applied to the interior of the cylinder.

Figure 8:
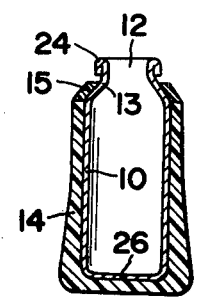
FIG. 8 is a sectional view showing the state in which the peripheral edge of the opening portion of the container is worked by curling.

Subsequently, as illustrated in FIG. 8, an edge portion 24 is formed by curling and working the peripheral edge of the opening portion. The curling work may alternatively be carried out in subsequence to the stage of work of the necking press.

As stated above, in accordance with the present invention, pressure-proof containers being different in the exterior design can be produced. The containers disclosed in the foregoing explanation are useful as pressure-proof spray containers for hair spray, insecticide spray, paint spray, cleanser spray, etc. While a variety of modifications and alterations are possible as to the inventive concept of the present invention, they are deemed to fall within the scope of the subject matters as well as disclosed matters of the present invention. The invention ought not to be restricted by the embodiments unless the scope clearly defined by the following claims is departed from.

What is claimed is:

1. A method of making a metallic container overlaid with plastic, said method comprising:

inserting a metallic cylinder, open at one end thereof and having a bottom at the other end thereof, supported on a mandrel into a first mold;

forming an outer layer of thermoplastic material around the outer periphery of the cylindrical side and bottom of said cylinder, except at the open end of said cylinder, by injection-molding to form an outer thermoplastic layer at least 2 mm thick;

removing said cylinder with said outer layer of thermoplastic material thereon from said first mold;

reducing said open end of said cylinder where said outer thermoplastic layer is not present to form a necked shoulder portion of gradually decreasing diameter toward said open end of said cylinder, said necked shoulder portion terminating in an edge portion around the opening at said open end of said cylinder;

inserting said cylinder into a second mold in such a manner that said open end of said cylinder where said necked shoulder portion is formed is supported by a hollow shank to prevent said necked shoulder portion from collapsing;

forming a thermoplastic layer, contiguous to said outer thermoplastic layer, on and around said necked shoulder portion except at said edge portion by injection-molding a thermoplastic material of the same quality as that of said outer thermoplastic layer while said cylinder is internally pressurized by air introduced through said hollow shank to raise the internal pressure thereof;

removing said cylinder with said layers of thermoplastic material thereon from said second mold; and curling outwardly said edge portion.

* * * * *